United States Patent [19]

Sygnator

[11] 4,269,902

[45] May 26, 1981

[54] EXTRUDING AND TAPPING SCREW AND BLANK FOR MANUFACTURE OF SUCH SCREW

[75] Inventor: Henry A. Sygnator, Arlington Heights, Ill.

[73] Assignee: Illinois Tool Works Inc., Chicago, Ill.

[21] Appl. No.: 65,246

[22] Filed: Aug. 9, 1979

Related U.S. Application Data

[62] Division of Ser. No. 883,061, Mar. 3, 1978, Pat. No. 4,179,976.

[51] Int. Cl.³ .............................................. F16B 25/00
[52] U.S. Cl. ................................... 428/577; 428/583; 428/585
[58] Field of Search ..................... 428/585, 583, 577; 85/47, 48

[56] References Cited

U.S. PATENT DOCUMENTS

| 684,774 | 10/1901 | Baggs | 85/47 |
|---|---|---|---|
| 2,167,558 | 7/1939 | Upson | 85/46 |
| 2,703,419 | 3/1955 | Barth | 85/47 |
| 3,180,126 | 4/1965 | Carlson | 85/47 |
| 3,438,299 | 4/1969 | Gutshall | 85/41 |
| 3,724,315 | 4/1973 | Sygnaton | 85/47 |
| 3,752,030 | 8/1973 | Steurer | 85/46 |
| 3,812,639 | 5/1974 | Sygnator | 85/46 X |
| 4,042,342 | 8/1977 | Muenchinger | 428/585 |

FOREIGN PATENT DOCUMENTS

| 83290 | 1/1975 | Australia | 85/41 |
|---|---|---|---|
| 1022355 | 3/1966 | United Kingdom | 85/46 |

*Primary Examiner*—Brooks H. Hunt
*Attorney, Agent, or Firm*—Thomas W. Buckman; Richard K. Thomson

[57] ABSTRACT

A threaded fastener particularly designed for extruding and forming threads in a sheet metal material. A threaded shank region and threaded, generally, conical point region are interconnected by a thread forming and extruding region which includes a plurality of partially formed threads both in circumferential extent and depth of impression. The thread-forming region tapers downwardly toward the point region at an angle of about 6° to maximize the thread-forming capabilities of the screw.

8 Claims, 5 Drawing Figures

EXTRUDING AND TAPPING SCREW AND BLANK FOR MANUFACTURE OF SUCH SCREW

This is a division of application Ser. No. 883,061, filed Mar. 3, 1978, now U.S. Pat. No. 4,179,976.

BACKGROUND AND SUMMARY OF THE INVENTION

The present invention relates generally to threaded fasteners and more particularly to fasteners which are utilized to extrude and form threads in sheet metal material.

Heretofore, screws have been provided with conical-type, threaded points designated as gimlet points and typically have spaced threads on the point and shank for use in sheet metal applications. Other forms of extruding and/or thread-forming screws utilize a particularly configured blank, such as trilobular in cross section, upon which a thread form is impressed.

Still other varieties of extruding screws have been developed including those which incorporate a thread-forming region intermediate a pilot point and a threaded region with the thread forming region including a plurality of partially formed threads on a tapered shank region and on generally one peripheral segment of the thread-forming region.

While all of the above noted prior art threaded fasteners have met with a certain amount of success, total effectiveness and efficiency of such fasteners still can be greatly improved. For example, the ratio between drive torque and strip torque must be maximized especially as the panel thickness becomes smaller. For a given application, the torque to drive should ideally be very low and the torque to strip should be relatively high.

Many prior art fasteners require a relatively high amount of axial pressure to create the required extrusion and thread formation in an effort to maximize the strip/drive ratio.

Accordingly, a primary object of the invention is to provide a thread-forming and extruding screw which creates a maximum extrusion in a thin panel with a minimum amount of axial pressure.

Still another object of the invention is to provide a thread-forming screw which maximizes the torque to strip and drive ratio.

Still a further object of the invention is to provide a particularly configured blank upon which thread forms can be impressed to create an efficiently performing extruding and thread-forming screw.

A particular advantage of the invention is the provision of a thread-forming region which gradually tapers into the holding region while providing a large number of material working partial threads.

The above and other objects of the invention are provided by a blank and a threaded fastener produced by such a blank which includes a lead region and an upper shank region concentric to one another interconnected by a thread-forming region having a pair of dissimilar peripheral segments. At least one peripheral segment is tapered at an angle of approximately 6° to the upper shank region with the lower region of the one segment extending axially downwardly relative to the lower region of opposing peripheral segment. The thread-forming region is also configured so that any axial location on the thread-forming region the one peripheral segment will be of a greater radial extent from the axis than the other.

A threaded fastener formed on such a blank will have a generally conical or gimlet threaded point merging into the thread-forming region. The thread-forming region will have a plurality of partially formed threads tapering at an angle of about 6° formed on the peripheral segment and which all extend radially from the axis a greater amount than the opposing peripheral segment. The opposing peripheral segment will be substantially void of threads creating a wiping region for reforming and reworking the sheet metal material. All of the above features contribute to an efficient and effective extruding screw. The slight tapering of the thread-forming regions to the threaded shank and threaded-point region reduces the axial pressure necessary to drive and permits the formation of a plurality of pitches of partially formed threads creating a gradually expanding, single lobular region.

DESCRIPTION OF THE PREFERRED EMBODIMENT

Figure 1:
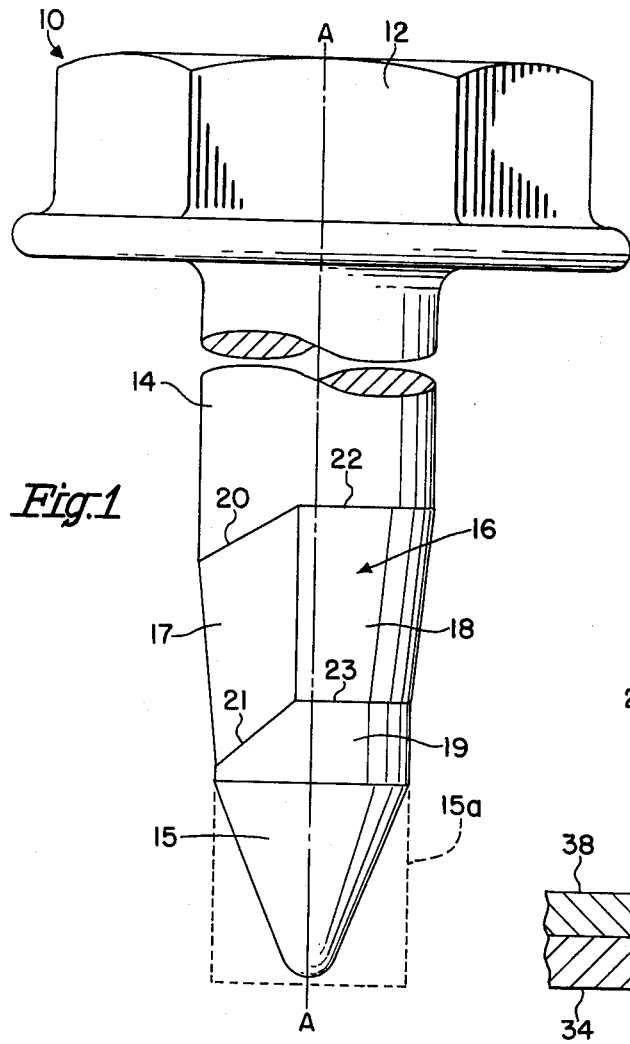
FIG. 1 is a side elevational view of a blank used in the manufacture of the threaded fastener.
Figure 2:
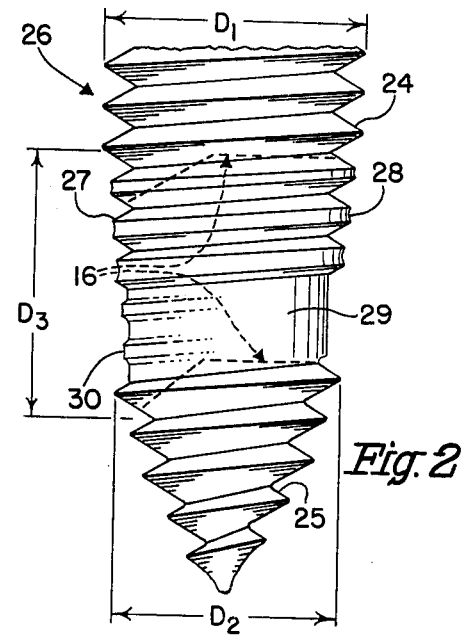
FIG. 2 is a partial side elevational view, taken in the same direction as that of the blank of FIG. 1, showing the entering region of the threaded fastener of the invention.

With reference to the drawings, and particularly FIGS. 1 and 2, a fastener and blank for manfacture of the fastener is denoted by reference numeral 10. The blank shown in FIG. 1, basically comprises an enlarged driving head 12, an upper, generally cylindrical, shank 14, a pilot region 15 of less diameter than the upper shank region 14, and an intermediate, generally tapered, region 16. While the blank shown includes a somewhat conical lead portion 15, it should be understood that a cylindrical lead portion 15a can be included with the desired gimlet point thereafter produced by somewhat conventional cutoff thread-rolling dies.

It is important to note that the thread-forming region 16 is comprised of two dissimilar, peripheral segments 17 and 18. A first of these peripheral segments 17 is configured as a portion of a frusto-conical surface having its axis offset laterally from the axis A—A of the fastener. The surface of segment 17 extends at an angle of 6° to the merging upper shank region and lower shank region. The juncture of segment 17 with the upper shank region 14 is in a plane 20 which is disposed at an acute angle to a plane extending perpendicular to the longitudinal axis of the blank. Likewise, the lower juncture of segment 17 is in a plane 21 extending at a similar acute angle to a plane extending perpendicular to the longitudinal axis of the blank.

The opposing peripheral segment 18 is a frustoconical section disposed generally about an axis concentric with the axis of the fastener and merging with the upper shank region and lower shank region in planes 22 and 23 which are generally perpendicular to the axis. As shown in FIG. 1, the opposing segments 17 and 18 are merged longitudinal at a plane preferably parallel to the axial plane of the fastener and offset laterally in a direction toward the circuit 17. Thread forming region 16 thus creates, at any given axial location, regions in segments 17 which extend radially a greater distance than opposing regions in segment 18. It also produces a lowermost region of the segment 17 extending downwardly a greater distance from the lowermost region of the opposing segment 18.

Thread-forming region 16 merges with a short axial extent of cylindrical shank 19 which in turn merges with the pilot region 15. Shank region 19 is preferably of the same diameter as the maximum diameter of pilot region 15.

The blank just described is thereafter subjected to conventional thread-rolling techniques to produce the threaded fastener such as shown in FIG. 2. A gimlet or type A threaded region 25 is formed on the point region 15 of the blank with a maximum crest diameter D2 at its upper region. Likewise, a threaded region 24 having a predetermined crest diameter D1 is formed on the shank region 14.

During the thread-rolling process, a particularly unique thread form is created on the intermediate region 16. Due to the lobular effect of peripheral region 17, a plurality of partially formed threads 27 are created in one peripheral segment of the thread-forming region 26. It is particularly important to note that a plurality of partially formed thread impressions 30, both as to circumferential extent and depth of impression, are created in the lowermost regions of the segment 17. Due to the slight 6° taper of region 26, a maximum number pitches of thread formations are created throughout the length of the thread-forming region, as the radial extent of the thread-forming region gradually increases toward the threaded region 24.

The uppermost region of the thread-forming section creates partially formed threads as to depth of impression on each opposing segment. For example, thread forms 27 and 28 are created which enhance the thread-forming capabilities of the fastener as will be described later herein.

Due to the particular configuration of the blank, a substantially unthreaded region 29 is created which extends an axial extent of at least two pitches opposing the partial thread configurations 30. The uppermost region of gimlet point 25 may be spaced downwardly from the lowermost region of configuration 30 but preferably not a distance greater than two pitches or that region will be a dwell region which would reduce the effectiveness of the screw. Thread forms 27 and 30 are continuous as to pitch separation between one another to ensure a continuous driving. The helix angle of threads in sections 25, 26 and 24 is the same.

It has been found that a particularly effective dimensional relationship is that in which the maximum crest diameter D2 of the gimlet threaded point is not less than 0.75 and preferably about 0.85 of the crest diameter D1 of the upper threaded region. To achieve the maximum efficiency of the fastener both as to reduction in axial pressure and maximization of the extrusion, the total axial extent of the thread-forming region D3 should be greater than the diameter D2 of the gimlet threaded region and thus substantially equal to the diameter D1 of the upper threaded region. Such a relationship in conjunction with the slight taper of 6° of the thread-forming segment 27 permits a large number of partial threads to be formed without an abrupt change in radial dimension.

Figure 3:
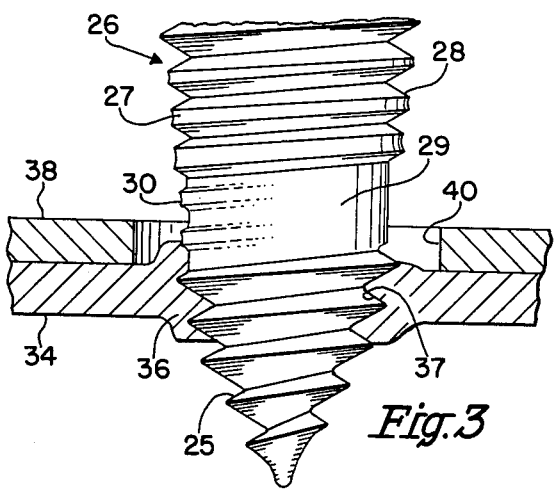
FIGS. 3–5 are partial side elevational views taken in the same direction as FIG. 2 showing the threaded fastener in various, successive, stages of extruding and thread-forming operation in a panel.
Figure 5:
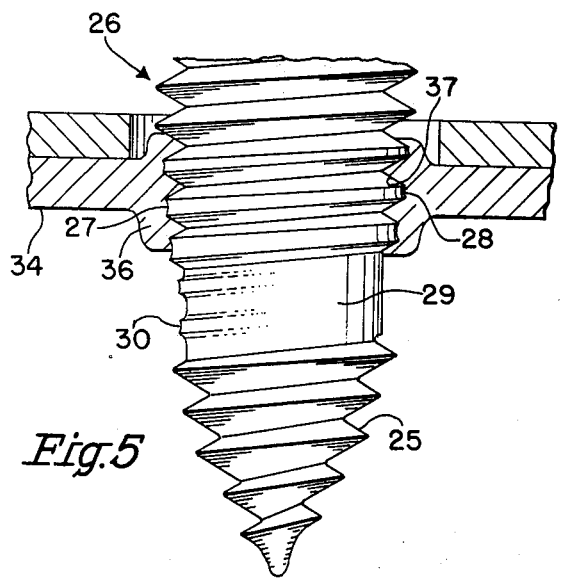
Figure 4:
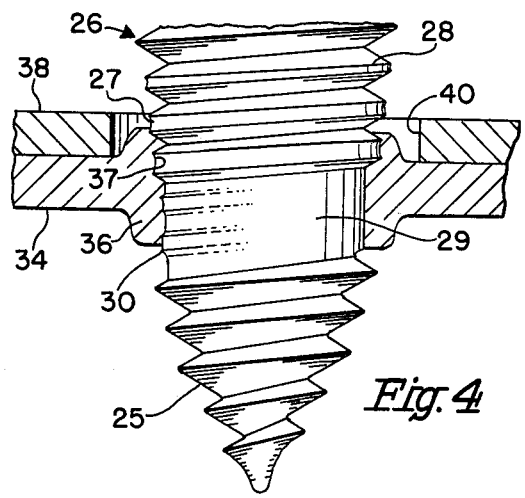

The importance and effectiveness of the above structural relation will become apparent with reference to the FIGS. 3–5 which depict the development of thread forms in a sheet metal panel as the fastener is forced to penetrate therethrough.

A typical application is one in which a lower panel 34 is provided with a small pilot hole of such a diameter to accept the extremity of a gimlet threaded point 25. The fastener is to clamp an upper panel 38 which is typically provided with a larger pilot hole 40. Turning to FIG. 3, it will be shown that the gimlet or substantially conical threaded-point region 25 initially engages a pilot hole in the lower panel, gradually enlarging and extruding the hole to create an extrusion 36 with internal threads 37 impressed thereon.

In FIG. 4, the novel thread-forming region of the invention is shown to gradually enlarge the hole while grasping the material of the hole with the partially formed threads 30. If the lowermost thread in the thread-forming region were spaced a significant distance from the uppermost thread in the gimlet point region 25, a significant pause in the extruding operation would be created as the unthreaded region spun within the extrusion without any positive axial pull created by the threads. Also, if the angle of taper of the thread-forming region were greater than the 6°, a large amount of radial pressure would be created in the extrusion at times creating a crack in the panel and, certainly, creating an excessive axial force necessary to continue the operation. However, with the 6° angle of the invention and the dissimilar segments, a particularly unique and effective extruding operation occurs.

While the partial thread forms 30 pick up in the threads already created due to the gimlet point 25, they are gradually enlarging the extrusion 36 in both inner diameter and axial extent thereof. However, on the opposing side of the fastener, the substantially cylindrical, unthreaded, region 29 wipes away the threads previously formed by section 30 and thus further works the metal of the extrusion which in and of itself serves to lengthen the axial extent of the extrusion but also serves to prepare the metal for subsequent thread forming. The cold working of regins 29 and 30 tends to eliminate stress in the extrusion.

As shown in FIG. 5, the upper regions 27 and 28 serve to create the final form of the extrusion both as to axial extent, thread depth and radial extent of aperture.

A threaded fastener has now been disclosed which incorporates a gimlet point, to create an initial extrusion and thread form in a panel, and a thread-forming region, which subsequently wipes and reforms the thread form initially formed. A gradually tapering thread-forming section is included, without a substantial break in thread forms, so that the fastener will not encounter any dwell period or abrupt changes in torque as the fastener is penetrated through the workpiece. In effect, a single lobular thread-forming region is created with a lower portion having thread forms on one segment and a substantially cylindrical segment void of thread forms on the other segment. This lower region creating the axial pull and wiping and reforming section, while an upper region of the thread-forming secion is thus free to gradually expand the hole in diameter and axial height without excessive stress on the panel.

Thus, there has been described a thread-forming extruding screw which meets all of the objects of the invention and particularly includes a thread-forming section which enhances the ease of insertion of the fastener while maximizing the extrusion and threads formed in the extrusion.

I claim:

1. A screw blank used in the formation of an extruding and thread-forming screw fastener, including a shank with an enlarged head at one extremity, the shank comprised of a substantially cylindrical upper portion of a predetermined diameter adjacent the head of the blank, a lead portion formed at the extremity opposite the head, the largest diameter of the lead portion being less than the predetermined diameter of the upper shank portion, an intermediate, transition shank portion between the lead and the upper shank portions and including a pair of dissimilar partially frustoconical tapering regions forming two opposing, peripheral segments of said transition portion located on either side of a plane extending longitudinally of the blank, a first of said two opposing peripheral segments merging with the upper shank portion along a juncture line lying on a plane transverse of said shank which is disposed at an acute angle downwardly relative to a plane extending perpendicularly to the longitudinal axis of the blank, the lowermost region of the first of said two segments extending downwardly on the shank a distance from the head which is greater than the extent of the lowermost region of the second of said two segments, the angle of taper of at least the first of said two peripheral segments relative to the longitudinal axis of the blank being generally 6° so that a single lobular region is created on a blank which facilitates the formation of a screw with a thread-forming region having a plurality of partial threads on the lobular region and an absence of threads on the opposing peripheral side of the screw which therefore minimizes the drive torque to apply a screw of this type.

2. The blank of claim 1, wherein th lead portion is conical.

3. The screw blank of claim 1, wherein the intermediate shank portion also includes a short cylindrical section of a diameter equal to the largest diameter of the lead portion point and interconnecting the tapering regions to said lead portion.

4. The screw blank of claim 1, including a partial cylindrical section opposing the lowermost region of the first peripheral tapered segment.

5. The screw blank of claim 1, wherein the two opposing peripheral segments are joined in a plane parallel to the plane including the central axis and offset from the central axis plane toward the side of the central axis which includes the first peripheral segment.

6. The screw blank of claim 1, wherein the lead portion is coaxial with the upper shank region.

7. The screw blank of claim 1, wherein the lowermost region of the first peripheral segment merges with the short cylindrical section along a juncture line which is generally parallel to the juncture line between the upper shank portion and the upper region of the first peripheral segment.

8. The screw blank of claim 1, wherein the second of said two opposing peripheral segments has an angle of taper of generally 6° relative to the longitudinal axis of the blank.

* * * * *